Patented Sept. 5, 1939

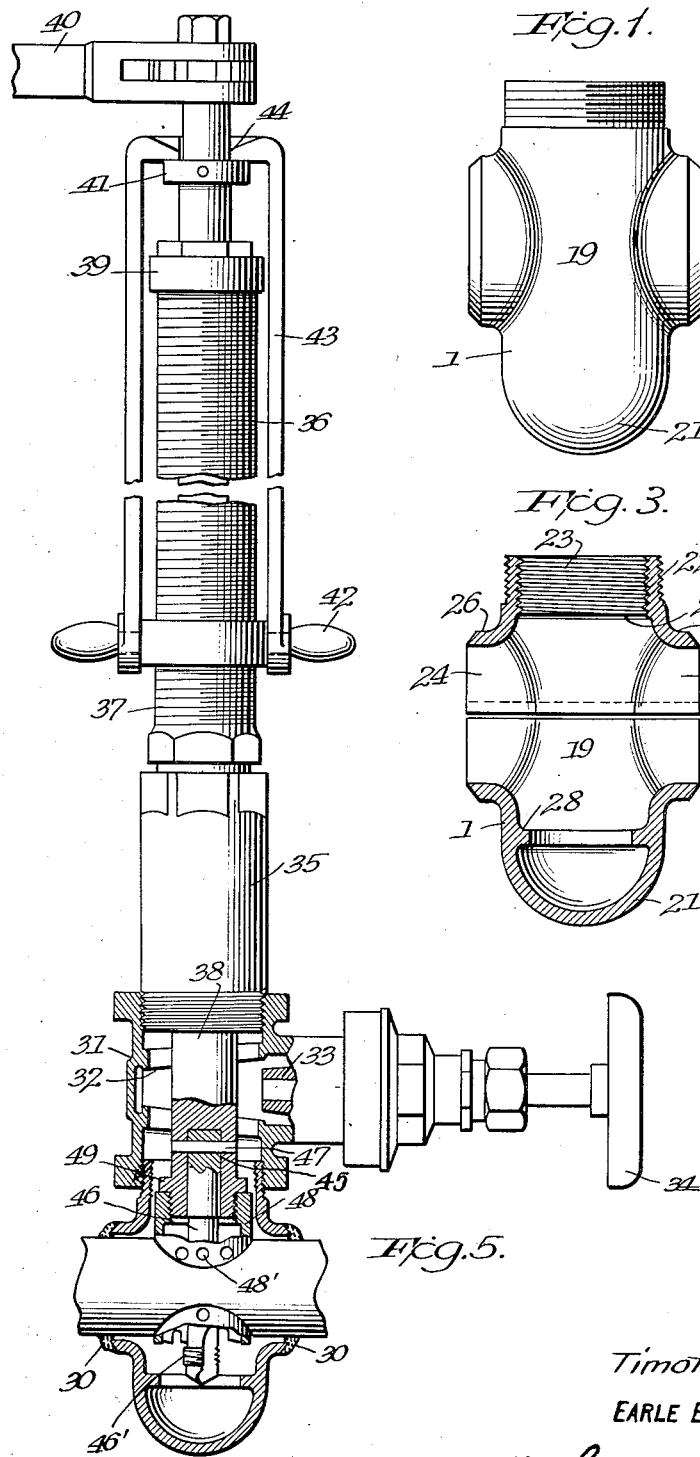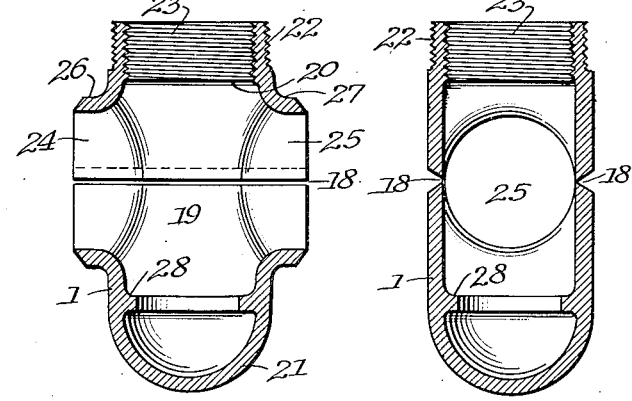

2,171,575

UNITED STATES PATENT OFFICE 2,171,575

PRESSURE CONTROL FITTING

Timothy Allan Larry and Earl E. Cline, Decatur, Ill.; said Cline assignor to Mueller Co., Decatur, Ill., a corporation of Illinois Application September 14, 1936, Serial No. 100,782

3 Claims. (Cl. 138—92)

This invention relates to, and has for its object, the provision of fittings for use in tapping fluid conduits and more particularly to the provision of a fitting which may be welded to a pipe and to which an enclosed drilling apparatus may be attached for establishing an opening in the pipe and within the fitting.

Other objects of the invention will be apparent from the accompanying description and drawing. Referring to the drawing:

Figure 1 is a side view of one form of the fitting, as it is customarily manufactured and sold, and before it is cut into two parts and attached to the pipe.

Figure 2 is an end view of the fitting shown in Figure 1.

Figure 3 is a longitudinal sectional view of the fitting of Figure 1, after it has been cut into two parts.

Figure 4 is a transverse sectional view of the fitting of Figure 1, after it has been cut into two parts.

Figure 5 is a view, partly in section, of the fitting welded to a pipe and a drilling apparatus associated with the fitting.

Referring more particularly to the drawing, the fitting 1 is preferably formed as an integral casting, as shown in Figures 1 and 2, although it may be formed otherwise, and in the usual installation it is thereafter divided into two parts, as shown in Figures 3 and 4, by cutting along the two sides at 18. The fitting consists of a substantially cylindrical or tubular body 19, having an opening 20 at its upper end and closed at its lower end 21. The upper end, as shown in Figures 3 and 4, is preferably threaded exteriorly at 22, for the attachment of a gate valve, or other apparatus, and the upper end is preferably also threaded interiorly as at 23, so that a threaded closure may be inserted, if desired.

The fitting is provided with aligned lateral openings 24, 25, which are adapted to receive a pipe, and the openings are bounded by the laterally extending hubs or flanges 26 and 27. The lower cylindrical portion is provided interiorly with a circumferential ledge or projection 28, which is adapted to serve as an abutment to limit the inward or downward movement of a shut-off or valve member which may be inserted through the open end of the fitting.

The fittings may be made of a high grade cast steel, of a composition similar to steel pipe, thereby insuring weldability, and are manufactured in various sizes for use with pipes of various diameters.

The attachment of the fitting to a pipe is preferably accomplished in the following manner. A fitting is selected, the lateral openings 24, 25 and hubs 26, 27 of which, preferably have an internal diameter appreciably or slightly larger than the external diameter of the pipe to which it is to be attached, for example, in actual practice a difference of approximately one-eighth of an inch has been found suitable. After the fitting is cut transversely and separated into two parts as shown in Figures 3 and 4, the upper and lower parts are brought together around the pipe and welded to each other at the line of severance 18, and the fitting is then welded to the pipe by the end welds 39, 30.

By reason of the fact that the internal diameter of the lateral openings 24 and 25 and the hubs 26 and 27 is, as stated above, preferably greater than the external diameter of the pipe, the fitting may be, and preferably is, so maintained with respect to the pipe that during the above mentioned welding operations the fitting does not contact the pipe. Maintaining the sides of the fitting out of contact with the pipe, while they are being welded, will assist in preventing an undesirable transfer of heat to the pipe, and will also insure a stronger connection at the welds 30, 30 than would be possible if the hubs contacted the pipe, the increased strength being due in part to the tendency of the molten welding metal to flow inwardly, between the hubs and the pipe, for a short distance, thus directly uniting a greater area of the pipe and hubs.

The construction, and method of attaching the fitting above described, not only enables the fitting to be manufactured and applied with great economy, but another problem, which heretofore presented serious difficulties in the use of tubular fittings, has been overcome. Reference is made to the fact that difficulty has been experienced in the use of the fitting disclosed in Patent No. 2,108,068, issued February 15, 1938, to Timothy Allan Larry, due to breaking of the shell cutters which are inserted through the upper open end of the cylindrical portion of the fitting for the purpose of drilling through the pipe within the fitting. It has been found that this is caused by carbonization and hardening of the portions of the pipe, which are within and adjacent the walls of the vertical cylindrical portion of the fitting, due to the heat used in welding the joint between the fitting and the pipe. It will be understood that, while this hardening of the metal occurred principally at the outer margin of the area of the pipe wall defined by the cylindrical portion of the fitting, the diameter of the shell cutters which are used is preferably nearly as great as the internal diameter of the cylindrical portion of the fitting, in order that substantially the entire cross section of the pipe may be cut out, and therefore the use of small shell cutters, which would cut between the zones of hardened metal, is not feasible.

The problem thus presented is solved by the present construction and method in that the fitting is welded to the pipe at a substantial distance from the portion of the pipe which is to be cut, and the zones of carbonized and hardened metal, which result from the application of the welding tool to the pipe, do not extend to the area defined by the wall of the cylindrical portion 19 of the fitting. The desirable spacing of the welds from the area, which is to be cut, is made possible in the present embodiment of the invention by the provision of the laterally extending hub portions 26 and 27. Furthermore the conduction of heat, from the points of application of the welding heat to the area within the cylindrical portion 19 of the fitting, is diminished by reason of the fact that the fitting is spaced from the pipe at all points and therefore does not act as an additional conductor of heat to the said area, as it would if it were in contact with the pipe.

A further advantage of the radially extending hubs 26, 27 resides in the added strength that they give to the assembly, which may include various pieces of apparatus connected, directly or indirectly, to the upper open end of the fitting. Such apparatus is necessarily subjected to stresses, including torques, and the hub portions greatly increase the rigidity of the structure.

It will be understood that in some instances, as for example where the fitting is to be attached to a relatively short pipe, the pipe may be preliminarily inserted through the lateral openings of the fitting 1 and it will be unnecessary to cut the fitting into two parts. The internal diameter of the lateral openings and hubs are nevertheless preferably appreciably greater than the external diameter of the pipe in order to obtain a stronger union between the fitting and the pipe and to reduce conduction of heat from the end walls interiorly of the fitting, as above described.

After a fitting has been welded to a pipe, a valve body 31 having a tapered valve seat 32 and provided with a valve, preferably a gate valve 33, operable by a handle 34, as shown in Figure 5, is threaded on the upper end of the fitting. An opening may now be established in the pipe and within the fitting, without substantial loss of fluid or fluid pressure by means of the method and apparatus now to be described.

An adapter sleeve 35 is threaded into the upper end of the valve body 31, as shown in Figure 5, and a device or machine 36, generally similar to pipe drilling machines of well known construction and including a feed sleeve 37, is positioned upon the adapter sleeve 35 by means of screw threaded engagement between the feed sleeve 37 and the upper end of the adapter sleeve 35. A bar 38 is slidably and rotatably mounted within the feed sleeve 37, a fluid tight joint being maintained between the two by means of conventional packing (not shown) secured upon the upper end of the feed sleeve 37 by an internally flanged collar 39. The bar 38 is provided at its upper end with an operating handle 40 having a conventional ratchet device thereon to permit the bar 38 to be rotated with a ratchet effect. A collar 41 is fixed on the upper portion of the bar 38 beneath the handle 40 and, in order that the bar 38 may be fed downwardly in the usual manner, a feed screw 42 is threaded upon the feed sleeve 37 and may be connected to the bar 38 by means of a yoke 43 pivoted upon the feed screw and having its head portion slotted as at 44 so that it may be moved into engagement with the upper surface of the collar 41 as shown in Figure 5.

The lower end of the bar 38 is provided with a central bore 45 for the reception of a pilot drill 46, which is retained therein by means of a pin 47 passing through suitable apertures in the bar and pilot drill. The lower end of the pilot drill is enlarged to provide a shoulder 46' thereon.

The lower end of the bar 38 is externally threaded for engagement with the internal threads of a shell cutter 48, and is provided with a flange 49, positioned above the screw threads, against which the upper end of the shell cutter abuts when the latter is tightly screwed onto the bar. The wall of the shell cutter is preferably apertured as indicated at 48' in order that the flow of fluid through the pipe 1 will not be interrupted during the cutting operation.

In order to drill through the pipe 1, within the fitting 17 the bar 38 is moved downwardly, with the gate valve 33 open, until the pilot drill 46 engages the pipe. The yoke 43 is then swung into engagement with the bar 38, its slotted head portion positioned above the collar 41 of the bar, and the drilling accomplished by rotating the bar 38 by means of handle 40 and applying downward pressure by rotating the feed screw 42 to the right.

The diameter of the shell cutter 48 is preferably slightly greater than the internal diameter of the pipe 1, in order that substantially the entire cross-section of the pipe will be removed, as shown in Figure 5.

It will be understood that the pilot drill precedes the shell cutter through the pipe and acts as a guide for the shell cutter. The coupons, which are cut out of the pipe by the shell cutter, will be caught on the shoulder 46' as the lower end of the pilot drill is withdrawn.

Owing to the fact that the drilling device is completely enclosed, no fluid will escape during the drilling operation.

When the drilling is completed the yoke 43 is disengaged from the bar 38 and the latter is then raised to withdraw the shell cutter and pilot drill into the adapter 35. The gate valve 33 is now operated to closed position and the drilling apparatus 36 is removed by unscrewing the adapter 35 from the valve body 31.

Apparatus for shutting off or diverting the flow of fluid within the pipe may now be secured to the upper end of the valve body 31. If desired, a threaded closure may be screwed into the upper end of the fitting and the valve body 31 may be removed.

It will be understood that the fitting may be modified in many ways, as, for example, by the provision of a flange at the upper end for the purpose of attaching flanged apparatus thereto.

It is therefore intended that all matter contained in the above description or shown in the accompanying drawing shall be regarded as merely illustrative.

Matter described but not claimed herein is claimed in our copending applications Serial Nos. 122,248 and 122,249, filed January 25, 1937.

We claim:

1. A fitting for use in tapping a fluid conduit, comprising a substantially cylindrical member having aligned lateral openings intermediate its ends for the reception of a pipe, one end of said cylindrical member being open and the other end closed, said cylindrical member being provided with annular flanges adapted to be welded to the pipe, said flanges being of sufficient extent to remove the areas of change of texture of the pipe wall produced by welding to points beyond the portion of the pipe within the cylindrical member.

2. A fitting for use in tapping a fluid conduit, comprising a substantially cylindrical member having aligned lateral openings intermediate its ends for the reception of a pipe, one end of said cylindrical member being open and the other end closed, said cylindrical member being provided with annular flanges extending outwardly from said lateral openings, said flanges being adapted to be welded at their outer edges to the pipe, the outer edges of said flanges being spaced a sufficient distance from said cylindrical member to remove the areas of carbonization and hardening of the pipe wall produced by the welding to areas outside of the space defined by the inner wall of said cylindrical member.

3. A fitting for use in tapping a fluid conduit, comprising a substantially cylindrical member having aligned lateral openings intermediate its ends for the reception of a pipe, one end of said cylindrical member being open and adapted to receive a cutting tool, the other end of said cylindrical member being closed by a substantially semi-spherical wall portion, said cylindrical member being provided with annular flanges bounding said lateral openings and extending outwardly therefrom, said flanges being adapted to be welded at their outer edges to the pipe, the outer edges of said flanges being spaced a sufficient distance from said cylindrical member to remove the areas of carbonization and hardening of the pipe wall produced by the welding to areas outside of the space defined by the inner wall of said cylindrical member.

EARL E. CLINE.
TIMOTHY ALLAN LARRY.